United States Patent
Murphy (10) Patent No.: US 6,728,077 B1
(45) Date of Patent: Apr. 27, 2004

(54) SUSPENSION-LEVEL PIEZOELECTRIC MICROACTUATOR

(75) Inventor: James Morgan Murphy, Boulder, CO (US)

(73) Assignee: Seagate Technology LLC, Scotts Valley, CA (US)

(*) Notice: Subject to any disclaimer, the term of this patent is extended or adjusted under 35 U.S.C. 154(b) by 603 days.

(21) Appl. No.: 09/081,393

(22) Filed: May 18, 1998

Related U.S. Application Data (60) Provisional application No. 60/051,694, filed on Jul. 3, 1997.

(51) Int. Cl.[7] .............................. G11B 5/55; G11B 21/10
(52) U.S. Cl. .................................. 360/294.4; 360/294.6
(58) Field of Search ................................. 360/104, 106, 360/105, 109, 78.05, 294, 294.1, 294.3, 294.4, 294.6

(56) References Cited

U.S. PATENT DOCUMENTS

| | | | | |
|---|---|---|---|---|
| 4,858,040 A | * | 8/1989 | Hazebrouck | 360/109 |
| 5,303,105 A | * | 4/1994 | Jorgenson | 360/106 |
| 5,359,474 A | * | 10/1994 | Riederer | 360/109 |
| 5,521,778 A | * | 5/1996 | Boutaghou et al. | 360/106 |
| 5,629,918 A | | 5/1997 | Ho et al. | 369/112 |
| 5,657,188 A | * | 8/1997 | Jurgenson et al. | 360/106 |
| 5,745,319 A | * | 4/1998 | Takekado et al. | 360/104 |
| 5,764,444 A | * | 6/1998 | Imamura et al. | 360/109 |
| 5,796,558 A | * | 8/1998 | Hanrahan et al. | 360/106 |
| 5,856,896 A | * | 1/1999 | Berg et al. | 360/104 |
| 5,867,347 A | * | 2/1999 | Knight et al. | 360/104 |
| 5,898,541 A | * | 4/1999 | Boutaghou et al. | 360/109 |
| 5,898,544 A | * | 4/1999 | Krinke et al. | 360/104 |
| 5,936,805 A | * | 8/1999 | Imaino | 360/104 |

FOREIGN PATENT DOCUMENTS

JP 2-227886 * 9/1990

OTHER PUBLICATIONS

Hutchinson Technology, product description, "Microactuation Test Platform", Sep., 1997.
Takaishi et al., "Microactuator Control Ffor Disk Drive", IEEE Transactions on Magnetics, vol. 32, No. 3, May 1996.

* cited by examiner

Primary Examiner—David L. Ometz
(74) Attorney, Agent, or Firm—Merchant & Gould P.C.

(57) ABSTRACT

A suspension-level piezoelectric microactuator for the fine positioning of a head-arm assembly of a disk drive. The microactuator is manufactured from a generally flat metal sheet structure having a central beam and two tabs extending from opposite sides of the beam. At least one layer of piezoelectric material is bonded onto each of the two tabs. Each of the two tabs is bent, with the piezoelectric layers bonded thereto, to a position substantially normal to the central beam. The structure is then joined to the distal end of a suspension member of the head-arm assembly. A recording head is connected to the central beam of the microactuator. When a voltage is applied to the piezoelectric materials, deflection of the microactuator occurs, thereby positioning the recording head.

25 Claims, 9 Drawing Sheets

FIG.1

USUALLY A SINGLE COIL BOBBIN

SUSPENSION-LEVEL PIEZOELECTRIC MICROACTUATOR

CROSS-REFERENCE TO RELATED APPLICATIONS

The present invention claims the benefit under 35 U.S.C. §119(e) of U.S. Provisional application Ser. No. 60/051,694, filed Jul. 3, 1997, by James Morgan Murphy, and entitled "SUSPENSION-LEVEL PIEZOELECTRIC MICROACTUATOR", which application is incorporated by reference herein.

BACKGROUND OF THE INVENTION

1. Field of the Invention

The present invention relates generally to disk drives, and particularly to a suspension-level piezoelectric microactuator for read/write heads for disk drives.

2. Description of Related Art

One of the main avenues for the increase in storage capacity of disk drives is through reduction of the track pitch of the recorded information. The minimum distance between recorded data tracks is limited by the ability of a voice coil motor (VCM)—actuated servo system to accurately maintain the position of the recording heads over a given track.

The positioning capability of this servo system is limited by its bandwidth, which in turn is constrained by the power available to the VCM and by suspension resonances. The resolution of the actuator's motion is also limited by stiction in the pivot's ball-bearings. Both of these constraints are approaching fundamental limits after which further increase in track density will be not be possible with the current technology.

To improve track density, proposals have been made to implement second-stage, fine-positioning, in addition to first-stage, coarse positioning. For example, Takaishi et al. propose a secondary microactuator which is built into the head assembly structure, as part of the head mounting block, between the head suspension and the head assembly arm ("Microactuator Control For Disk Drive", Takaishi et al., IEEE Transactions on Magnetics, Vol. 32, No. 3, May 1996). Another secondary actuator arrangement is described in U.S. Pat. No. 5,521,778 to Boutaghou et al., wherein the secondary actuator 30 connects one end of a further arm portion (a load beam 25) to an actuator arm 24 and wherein a slider 26 and head are supported at the opposite end of the load beam 25.

In each of the above-referenced proposed systems, a substantial length of the head support structure is located between the head and the secondary actuator. For example, as shown in FIG. 4 of the Takaishi et al. article, a head suspension, which accounts for a significant portion of the length of the structure supporting the head, extends from the secondary actuator to the head. Similarly, as shown in FIG. 1 of the Boutaghou et al. patent, the load beam 25, which accounts for about one-half of the length of the structure supporting the head, extends from the secondary actuator to the head.

As such, each of these structures may be susceptible to a significant level of structural resonance, upon operation of the secondary actuator. Such resonance tends to result in unwanted head motion, which inherently reduces the accuracy of the positioning operation and, thus, reduces the available track density.

Accordingly, there is a need in the art for a microactuator for supporting and finely-positioning a read and/or write head with sufficient accuracy to operate with a track pitch substantially below that possible with typical VCM servo system operation.

SUMMARY OF THE DISCLOSURE

To address the requirements described above, the present invention discloses a suspension-level piezoelectric microactuator for the fine positioning of a head-arm assembly of a disk drive. The microactuator is manufactured from a generally flat metal sheet structure having a central beam and two tabs extending from opposite sides of the beam. At least one layer of piezoelectric material is bonded onto each of the two tabs. Each of the two tabs is bent, with the piezoelectric layers bonded thereto, to a position substantially normal to the central beam. The structure is then joined to the distal end of a suspension member of the head-arm assembly. A recording head is connected to the central beam of the microactuator. When a voltage is applied to the piezoelectric materials, deflection of the microactuator occurs, thereby positioning the recording head.

It is an object of the present invention to employ a second-stage, fine-positioning piezoelectric microactuator for positioning one or more heads of a disk drive relative to a recording surface. It is yet another object of the present invention to provide such a piezoelectric microactuator as a relatively small, light-weight device, located between the head and the suspension member of the head-arm assembly to exclude suspension resonance. It is a further object of the present invention to provide such a piezoelectric microactuator that is capable of very small movements on the order of at least one half the track width, for example, on the order of about 0.5 µm for a track pitch of about 1.0 µm. It is yet a further object of the present invention to provide such a piezoelectric microactuator that is capable of nanometer scale movements.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

The present invention discloses a novel second-stage, fine-positioning, microactuator for use with a read/write head of a disk drive. The microactuator has a much higher bandwidth than VCM actuators, and hence excludes suspension resonances. The microactuator of the present invention is a very small, lightweight device that is placed between the head and the suspension of the VCM actuator. The microactuator provides only a very small amount of movement—just enough to allow each head to follow its track. For example, only approximately ±0.5 $\mu$m of motion is necessary for a disk drive with a 1 $\mu$m track pitch (i.e., 25k tpi track density).

Disk Drive Structure

Figure 1:
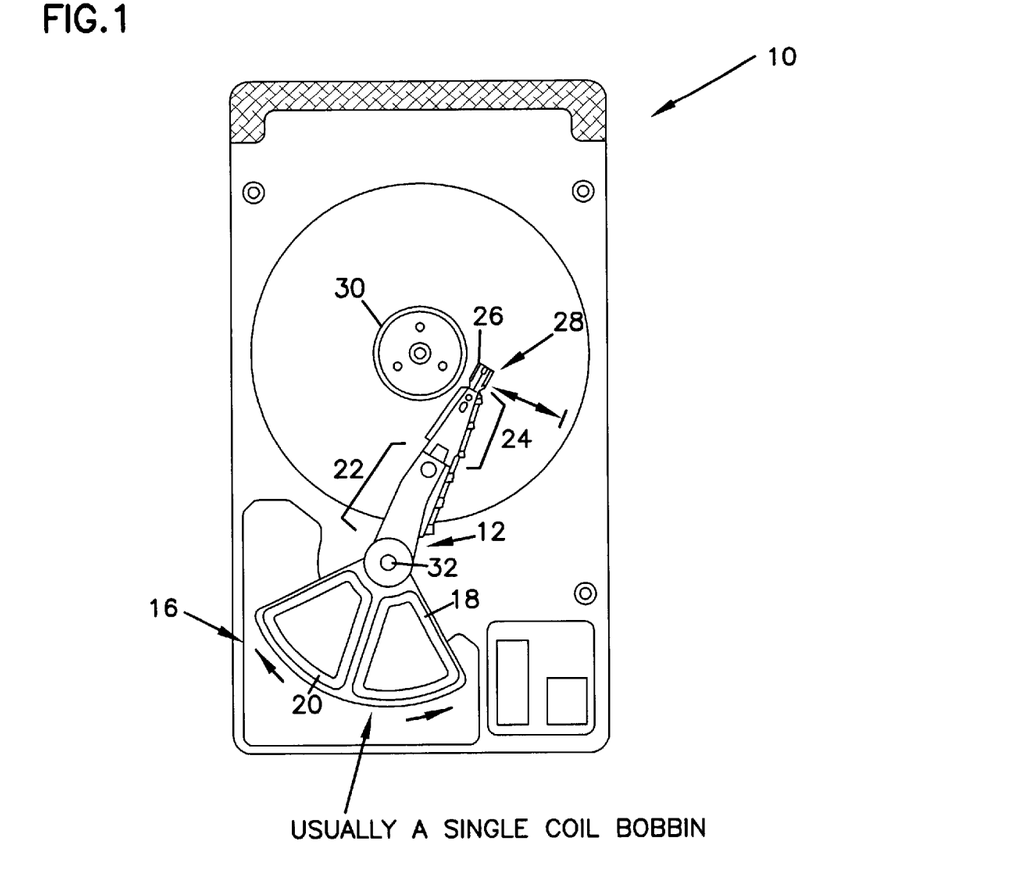
FIG. 1 is a top plan view of a disk drive assembly, wherein a top portion of the assembly has been cut-away to expose a head-arm assembly positioned over a platter.

FIG. 1 is a top plan view of a disk drive assembly 10, wherein a top portion of the assembly 10 has been cut-away to expose a head-arm assembly 12 positioned over a platter 14. In addition, a top portion of the magnetic structure assembly 16 is removed in order to expose the coil bobbins 18, 20 of a voice coil motor (VCM) that controls the movement of the head-arm assembly 12. The head-arm assembly 12 includes an arm 22, suspension member 24, microactuator 26, and a read/write head 28 positioned over the platter 14. Generally, a plurality of platters 14 are stacked on a spindle 30 and there are a plurality of head-arm assemblies 12 in an E-block structure to access the platters 14 simultaneously, wherein each head-arm assembly 12 accesses one of two surfaces (top and bottom) of each platter 14.

In the present invention, the head-arm assembly 12 is comprised of both a first stage positioner and a second stage positioner. The first stage positioner comprises the VCM, arm 22, and suspension member 24 that effect rotational movement of the head-arm assembly 12 about a pivot bearing 32 for coarse positioning. The second stage positioner comprises a suspension level piezoelectric microactuator 26 that effects very small, crosstrack, movements of the read/write head 28 for fine positioning.

The first-stage positioner positions the read/write head 28 in the vicinity of the desired track of the platter 14. The second stage positioner then precisely aligns the read/write head 28 with the desired track of the platter 14. Thus, the use of the first and second stage positioners allows the disk drive 10 to operate with higher track densities and smaller track pitches than prior art systems.

For example, the second stage positioner is capable of fine scale movements to define a range of movement in the order of about half the width of the desired track. More specifically, in the preferred embodiment, the second stage positioner is capable of fine scale movements of distances on the order of a nanometer scale to provide an overall movement range of about ±0.5 $\mu$m for operation with a track pitch of 1 $\mu$m (or a track density of about 25k tpi). In addition, the second stage positioner provides a much faster response than prior art systems.

Piezoelectric Microactuator

Figure 2:
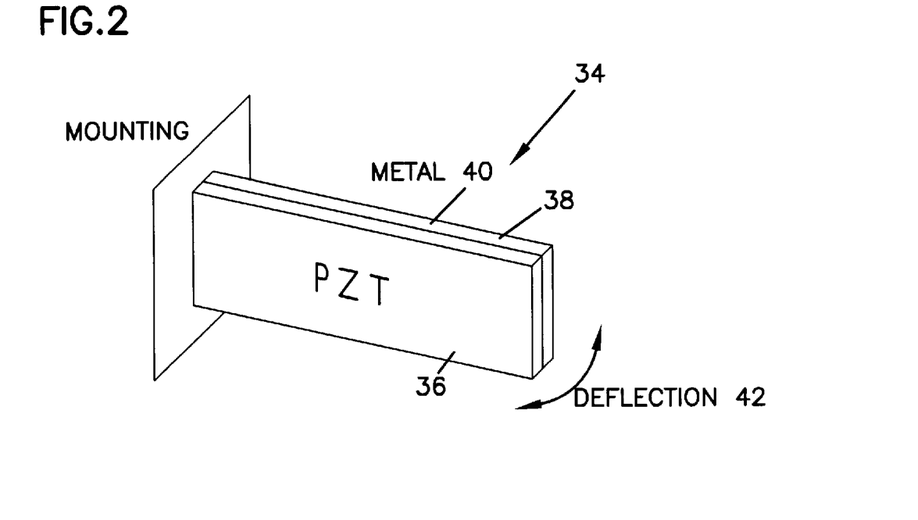
FIG. 2 illustrates a piezoelectric monomorph that may be used to implement the second stage positioner according to the present invention.

FIG. 2 illustrates a piezoelectric monomorph 34 that may be used to implement the second stage positioner according to the present invention. The monomorph 34 is comprised of piezoelectric elements 36, 38 bonded to a thin sheet metal structure 40. Applied voltages cause the piezo elements 36, 38 to expand or contract, which makes the structure 34 bend in much the same way a bimetallic strip does with changes in temperature. The piezoelectric monomorph 34 is fixedly mounted at one end while the opposite end produces the required motion by deflection through the arc labeled as 42. Similarly, the second-stage positioner of the present invention may also use piezoelectric bimorphs, which are comprised of two piezoelectric crystals bonded together that deform in opposite directions to produce a curvature.

The present invention, however, does not directly utilize the displacement the monomorphs 34 produce, but rather their curvature. This is possible by mounting the monomorph 34 such that its ends can rotate but not move. A monomorph 34 by itself would not be stable; it could buckle if subjected to vertical forces. This is why two intersecting monomorphs 34 are used, i.e., to create a more stable structure. Force or stiffness in the direction of deflection is not actually improved by utilizing the monomorph's 34 curvature instead of direct deflection.

Figure 3:
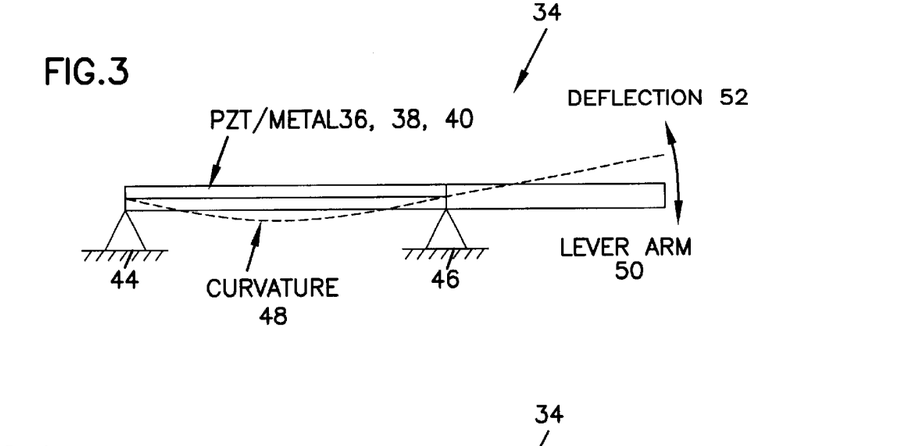
FIG. 3 illustrates a monomorph with pivots at each end.

FIG. 3 illustrates a monomorph 34 with pivots 44, 46 at each end. Voltages are applied to the piezoelectric elements 36, 38 bonded to the thin sheet metal structure 40, which causes the piezo elements 36, 38 to expand or contract. This expansion or contraction causes the structure 34 to bend through the curvature labeled as 48. The bending motion causes deflection in a lever arm 50 attached to one end of the monomorph 34 as indicated by the arc 52.

Figure 4:
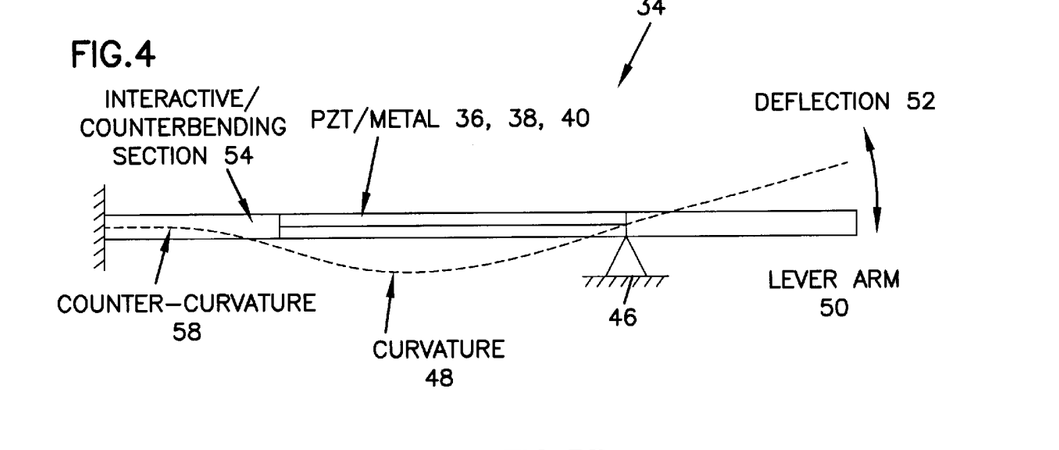
FIG. 4 illustrates a monomorph with one pivot at the end of the monomorph where the lever arm is attached.

For simplicity, however, the microactuator 26 of the present invention may only use a pivot point at one end, and uses an inactive or counter-bending section at the other end to achieve the same effect. FIG. 4 illustrates a monomorph 34 with one pivot 46 at the end of the monomorph 34 where the lever arm 50 is attached. At the other end, the monomorph 34 is attached to an inactive or counter-bending section 54 that is fixed mounted to a structure 56. Voltages are applied to the piezoelectric elements 36, 38 bonded to the thin sheet metal structure 40, which causes the piezo elements 36, 38 to expand or contract. This expansion or contraction causes the monomorph 34 to bend through the curvature labeled as 48. The bending motion causes deflection in a lever arm 50 attached to one end of the monomorph 34 as indicated by the arc 52. However, the inactive or counter-bending section 54 produces counter-curvature as indicated by the arc at 58.

Figure 5A:
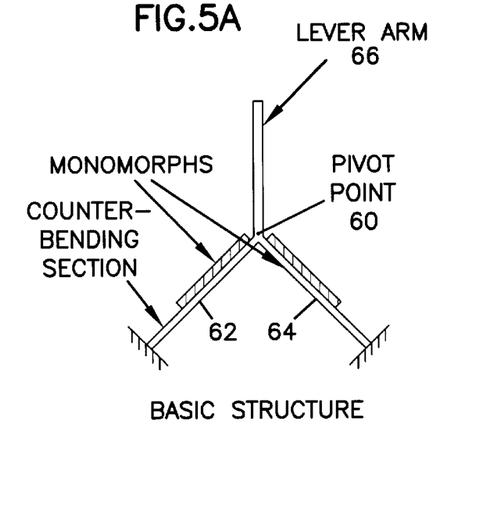
FIG. 5A illustrates another embodiment, wherein a pivot point is created by having two monomorphs intersect at their deflecting ends, such that they prevent each other from deflecting translationally, leaving rotation about the pivot point as the only unconstrained degree of freedom.
Figure 5B:
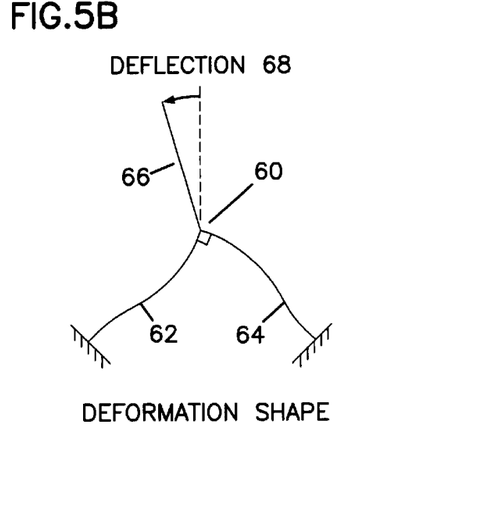
FIG. 5B illustrates the deflection of the lever arm through the arc when voltages are applied to the monomorphs causing them to bend in the manner indicated.

FIG. 5A illustrates another embodiment, wherein a pivot point 60 is created by having two monomorphs 62, 64 intersect at their deflecting ends, such that they prevent each other from deflecting translationally, leaving rotation about the pivot point 60 as the only unconstrained degree of freedom. A lever arm 66, to which the read/write head 28 is attached, is connected to this pivot point 60 and converts the rotation produced thereby into a translation at the head 28. FIG. 5B illustrates the deflection of the lever arm 66 through the arc 68 when voltages are applied to the monomorphs 62, 64 causing them to bend in the manner indicated.

Figure 6:
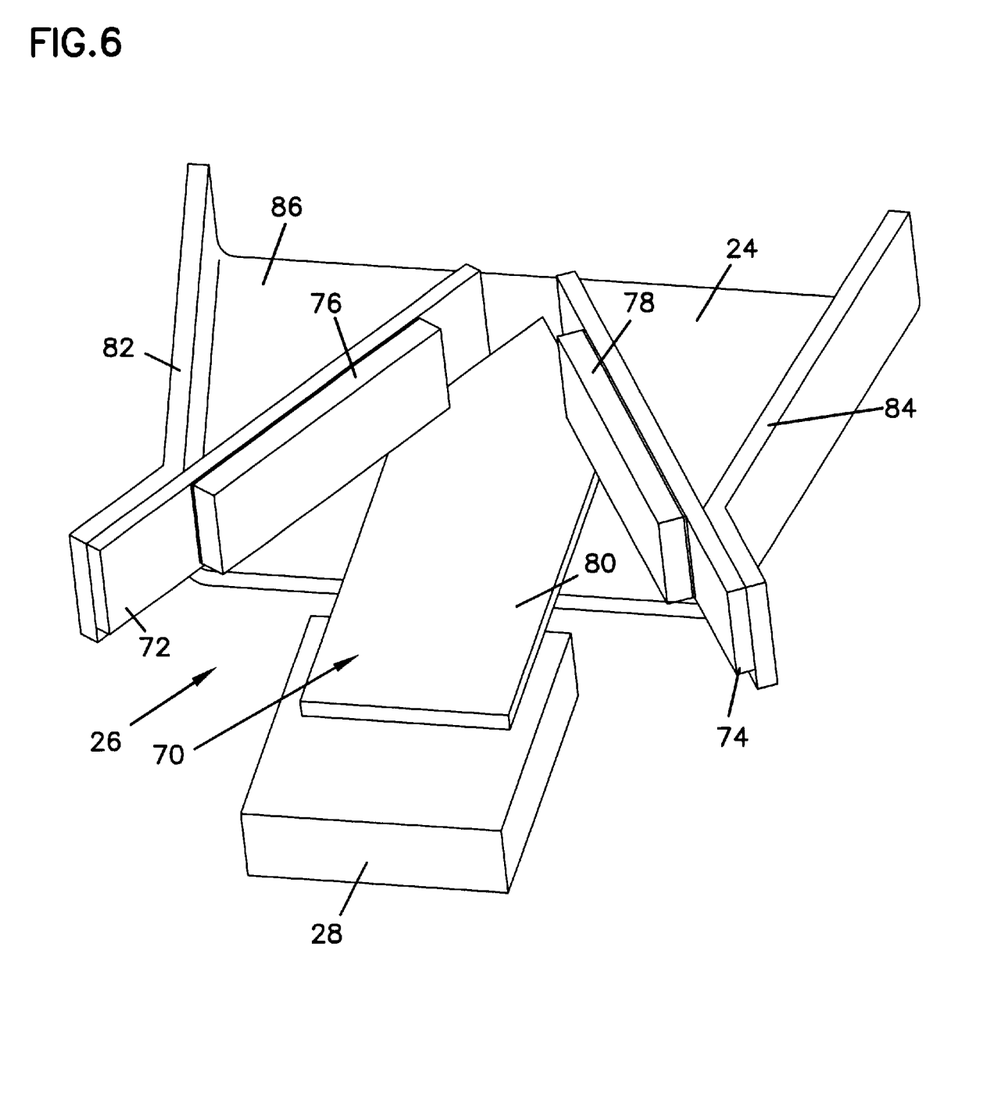
FIG. 6 illustrates a microactuator constructed according to the teachings of the present invention.

FIG. 6 illustrates a microactuator 26 constructed according to the teachings of the present invention. The microactuator 26 is mounted on the end of the suspension 24 and the head 28 is mounted on the end of the microactuator 26. In the preferred embodiment of the present invention, two monomorphs are constructed from a stainless steel sheet structure 70 that has two bent-up tabs 72, 74 to which piezoelectric elements 76, 78 are attached, respectively. These monomorphs are aligned symmetrically on either side of a central beam 80, with an angle of approximately 50–60 degrees between them. The structure is then joined to the distal end of a suspension member of the head-arm assembly, i.e., tabs 72, 74 are each laser spot-welded to the stiffening rails 82, 84 of the suspension 24, respectively, which are also bent up 90 degrees from the body 86 of the suspension 24, are somewhat higher than normal (0.4 mm or 16 mil instead of 0.2 mm or 8 mil for normal suspension), and protrude a short distance past the end of the suspension 24.

The head 28 is attached to the end of the beam 80 (which acts as the lever arm) by means of a gimbal(not shown). Wires (not shown) are attached to the read/write head 28 and to the top of the beam 80 in order to carry the electrical signals to and from the read/write head 28 Wires also carry the voltages that drive the piezo elements 76, 78 of the monomorphs. Generally, only a single wire need be attached to the piezo elements 76, 78, with the suspension 24 acting as a ground return. Opposite poling on each end of the piezo elements 76, 78 produces the opposite curvature necessary in the tabs 72, 74 to effect the movement of the read/write head 28.

Figure 7:
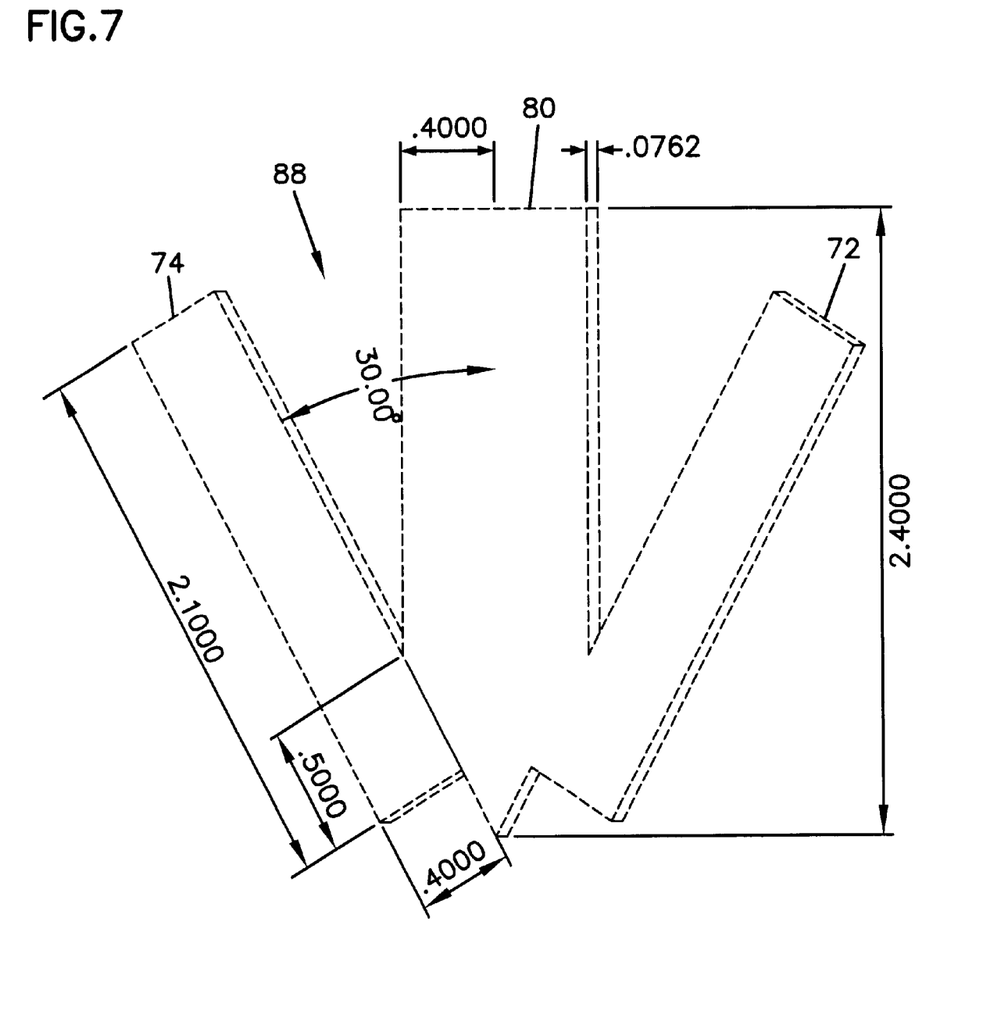
FIGS. 7, 8, 9, 10, and 11 illustrate the construction of the microactuator.

FIGS. 7, 8, 9, 10, and 11 illustrate the construction of the microactuator 26. Referring to FIG. 7, a 2.5–3 mil thick stainless steel sheet 88 is etched into the desired shape of the microactuator 26. In the preferred embodiment, the sheet 88 is etched to provide the central beam 80 as a stiffening rib, the two tabs 72, 74, and a gimbal dimple at its end (not shown). In this Figure, the central beam 80 is approximately 0.8 mm in width and 2.4 mm in length, although other dimensions may be used with departing from the scope of the present invention. Similarly, the tabs 72, 74 are 0.4 mm in width and 2.1 mm in length, share a 0.5 mm portion with the central beam 80, and are angled at 30 degrees off-center of the central beam 80, although other dimensions may be used with departing from the scope of the present invention.

Figure 8:
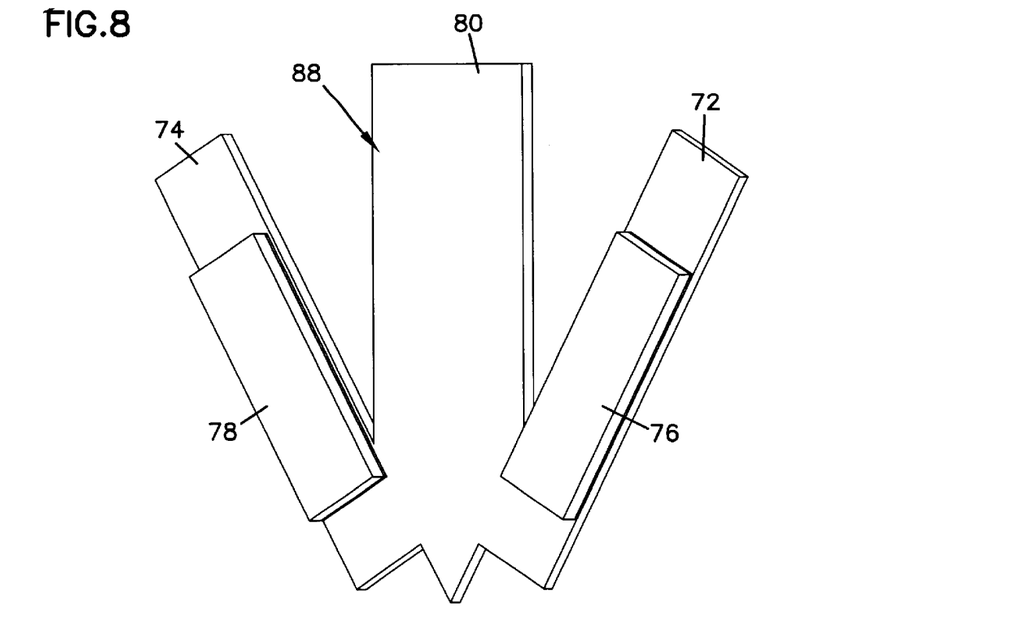
Figure 9:
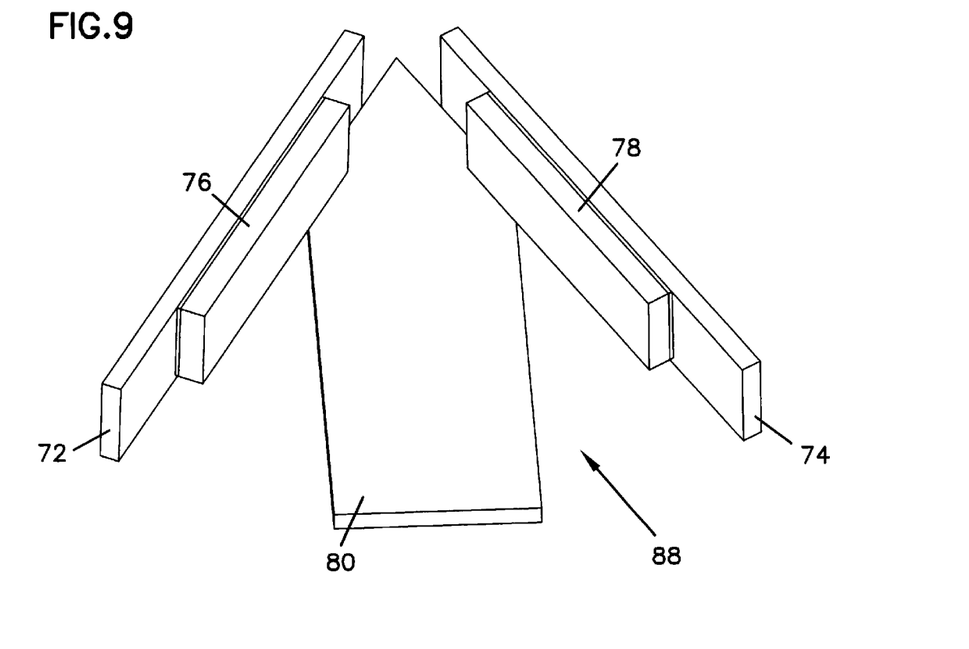
Figure 10:
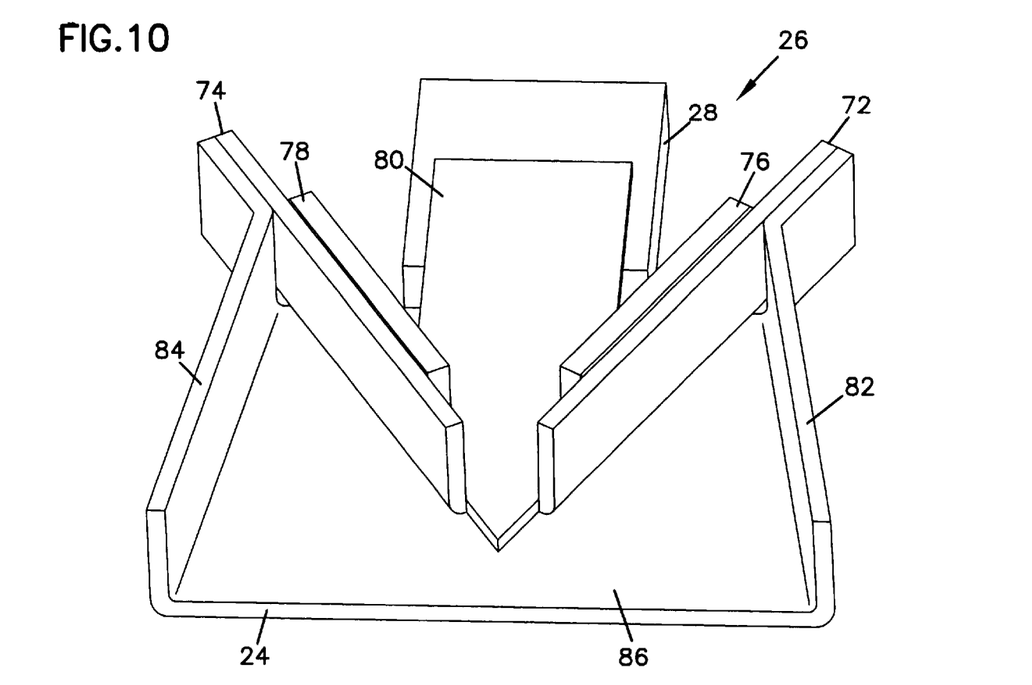
Figure 11:
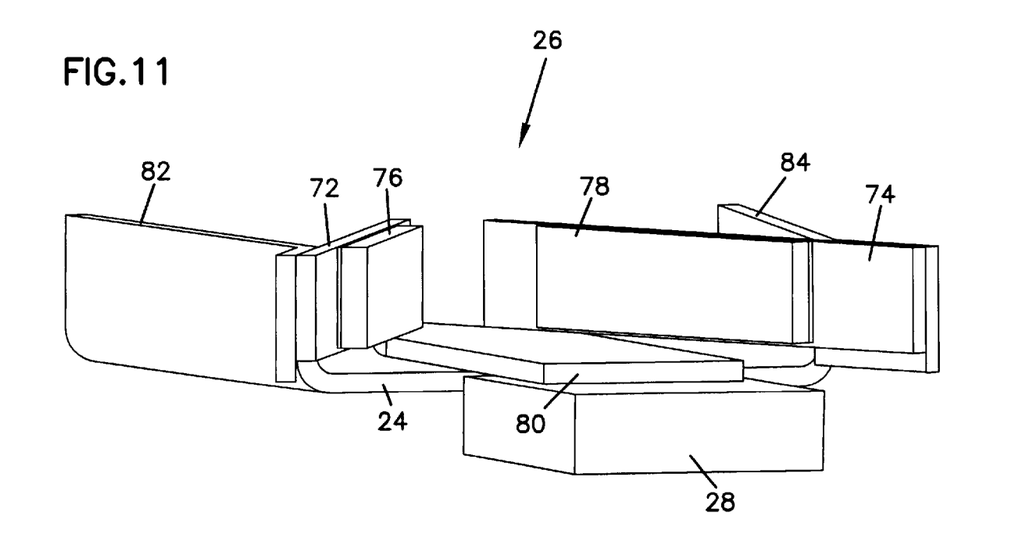

Referring to FIG. 8, this sheet 88 then has two 3–4 mil thick piezo crystals 76, 78 epoxy-bonded to its wing-like tabs 72, 74, respectively. Referring to FIG. 9, these tabs 72, 74, with the piezo crystals 76, 78 on them, are then bent up normal to the sheet 80. Referring to FIG. 10, the microactuator 26 is then aligned with the suspension 24 using tooling pins through holes in the suspension 24 (not shown) to contact mating features on the microactuator 26, and laser spot-welded to the suspension 24 via the end pads of the bent-up tabs 72, 74, and the protruding stiffening rails 82, 84 on the suspension 24. Referring to FIG. 11, a front view of the assembled microactuator 26 is thereby provided. The final step in the construction is for the wires to be attached to the top of the microactuator 26, and electrical connections between the wires and the top surfaces of the piezo elements 76, 78 to be made. The wires are also attached to the read/write head 28 to form the gimbal, wherein four wires are connected to contacts on the read/write head 28 for the transducers.

Figure 12:
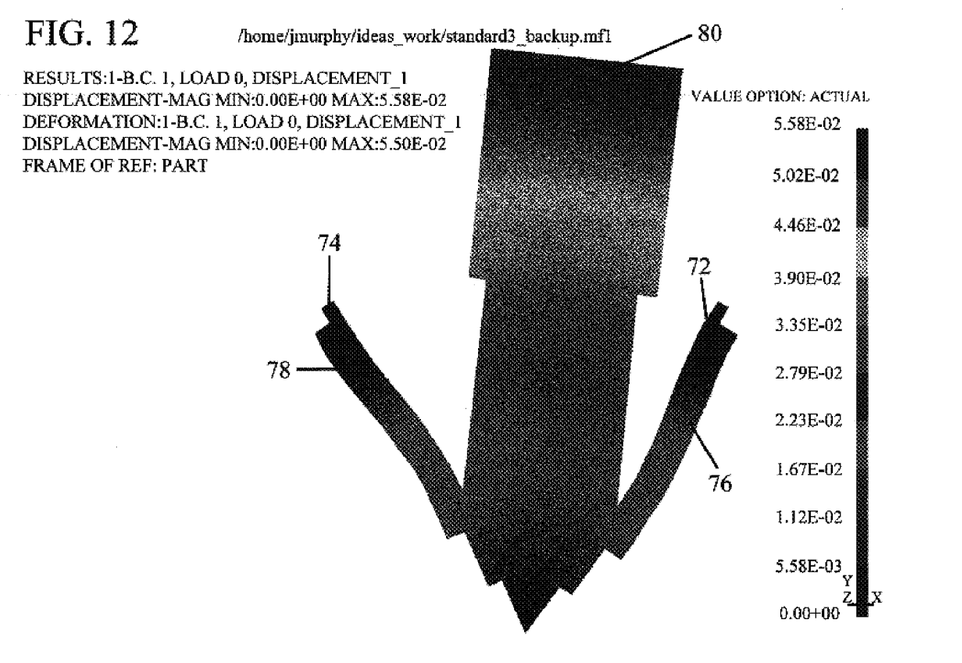
FIG. 12 is a plan view of the microactuator imposed upon a graph of displacement values that illustrates the principles of the operation of the microactuator.

FIG. 12 is a plan view of the microactuator 26 imposed upon a graph of displacement values that illustrates the principles of the operation of the microactuator 26. Voltages applied to the piezo elements 76, 78 cause them to bend to the deformation shape shown in FIG. 12. The curvature of the piezo elements 76, 78 is transformed into a rotation of the center beam 80 to which the read/write head 28 is attached. This rotation causes a lateral, cross-track movement of the read/write head 28. A drive voltage of ±36V produces a displacement range of between ±0.5 and ±1 $\mu$m, depending on the design configuration used. This voltage is achievable with a small (3–4%) increase in circuitry in the VCM-actuated servo system.

Note that the center point of the rotation produced is at the end of the beam 80 that provides the contact point between the beam 80 and the suspension 24 when the beam 80 is subject to the vertical preload force that must be transmitted to the read/write head 28. This is significant, because it means that this force can be transmitted at an interface that has no translational movement, and hence minimal wear. Also note that this preload force will create a slight clearance between the top surface of the suspension 24 and the bottom of the beam 80, obviating friction and wear at all locations.

The deformation shape shown in FIG. 12 is produced by having two sections of the monomorphs bend in opposite directions. This is produced with a single piezo element 76, 78 and a single driving voltage by having the two sections of the piezo element 76, 78 poled in opposite directions. 'Poling' is an important fabrication process in which the asymmetric electrostatic domains of the piezo crystal 76, 78 are partially aligned through the application of a strong electric field at an elevated temperature, causing a permanent elongation of the material.

Thereafter, the response of the piezo element 76, 78 is determined by the relative orientation of the poling vector and the applied electric field. An electric field in the same direction as the poling vector causes an increase in domain alignment, and hence further elongation of the crystal 76, 78, while an electric field in the opposite direction causes a decrease in domain alignment, and hence a contraction of the piezo element 76, 78. Note, however, that such opposing fields cannot exceed 40% of the maximum positive field, or the piezo elements 76, 78 will be 'depoled' resulting in the destruction of the domain alignment and hence the functionality of the device.

Figure 13:
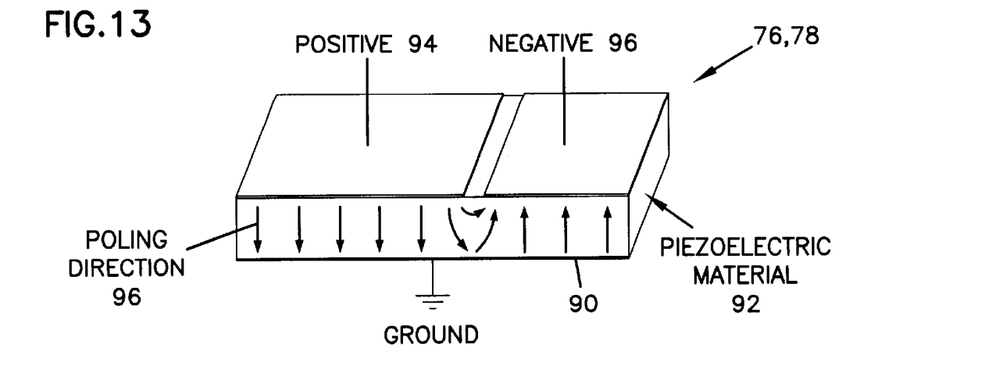
FIG. 13 illustrates a dual-electrode piezo element with poling directions shown.

FIG. 13 further illustrates the structure of the piezo elements 76, 78 of the present invention. The piezo elements 76, 78 are fabricated with a continuous conductive layer 90 deposited onto one side of the piezo electric material 92 and with two separate conducting pads 94, 96 on the other side. FIG. 13 illustrates a dual-electrode piezo element with poling directions 96 shown. These pads 94, 96 may be deposited using photolithographic techniques, and are used to apply the electric fields necessary to create the opposing poling vectors in the two halves of the device.

Figure 14:
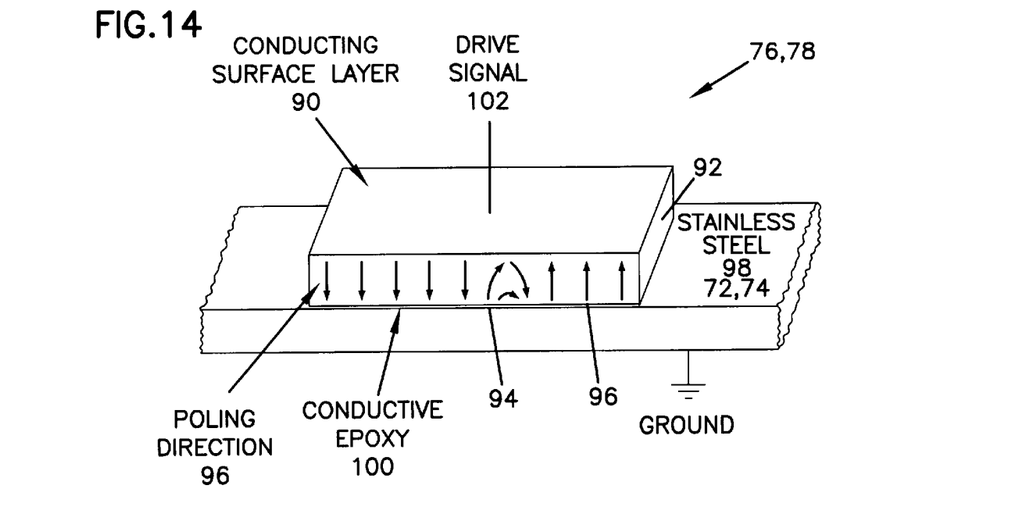
FIG. 14 illustrates a piezo element bonded to a stainless steel sheet.

FIG. 14 illustrates a piezo element 76, 78 bonded to a stainless steel sheet 72, 74. When the element 76, 78 is bonded (using a conductive epoxy 100) to the stainless steel sheet 72, 74, these two pads 92, 94 are on the inside abutting the sheet 72, 74, and so are shorted together. A single wire 102 is then attached to the top of the piezo element 76, 78 to supply the drive voltage. The return path is through the suspension 24, which is grounded. The drive current for both piezo elements 76, 78 is usually only 0.15–0.3 mA, so it is expected that the electrical noise produced by passing this current through the ground circuit will not be excessive.

Figure 15:
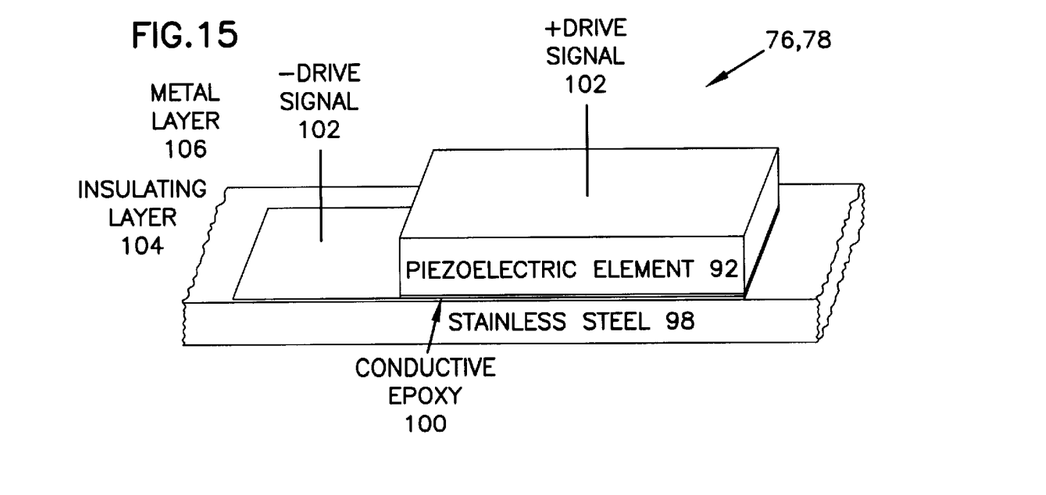
FIG. 15 illustrates a thin insulative layer covered by a thin conductive layer deposited on the steel sheet before the piezo element is bonded thereon.

If this is not the case, then a thin insulative layer 104 covered by a thin conductive layer 106 can be deposited on the steel sheet 98 before the piezo element 76, 78 is bonded thereon, as illustrated in FIG. 15. This insulating/conducting sandwich created by layers 104 and 106 has to protrude from underneath the piezo element 76, 78 so that a wire 102 for the drive voltage can be connected to the conductive layer 106.

Figure 16:
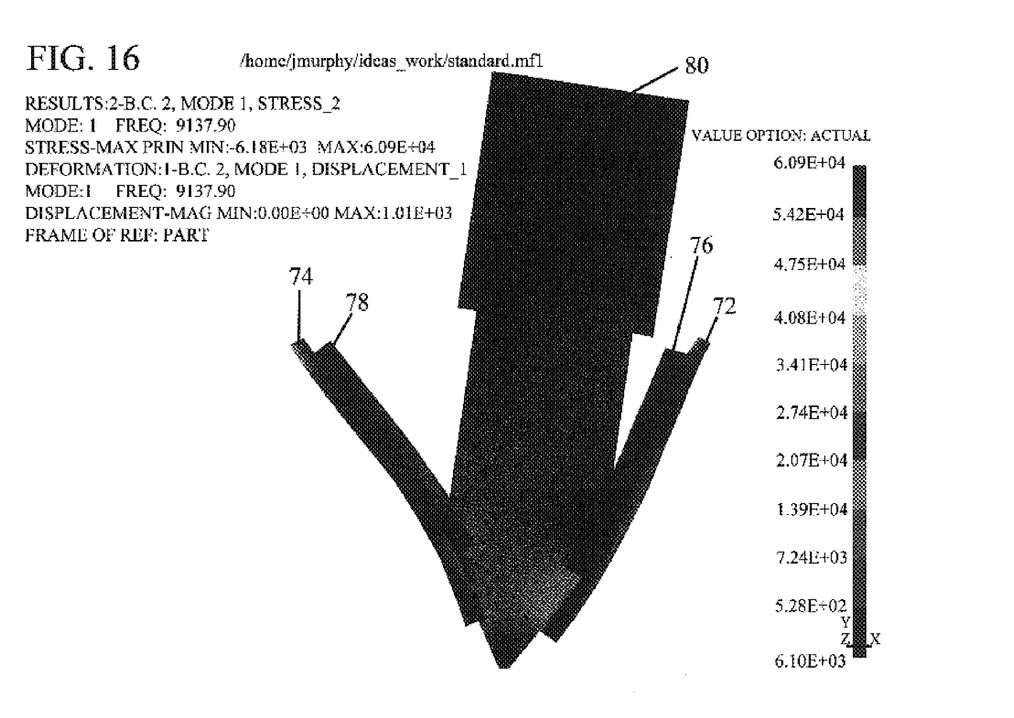
FIG. 16 is a plan view of the microactuator imposed upon a graph of displacement values that illustrates a first resonant mode shape for the microactuator from Finite Element Modeling.

FIG. 16 is a plan view of the microactuator 26 imposed upon a graph of displacement values that illustrates a first resonant mode shape for the microactuator 26 from Finite Element Modeling. Finite Element Modeling, supported by analytical calculations, indicates that the microactuator 26 should have a resonant frequency of the order of 9–10 kHz, depending on the final configuration.

In the preferred embodiment, the mass of the microactuator 26 is very low-approximately 1.6 mg, or about the same as that of a pico slider. Thus the combined slider-microactuator 26 mass will still be considerably less (35% less) than that of a 50% slider alone. Hence, the microactuator 26 should not significantly degrade the dynamics of the arm or suspension 24, especially if the structure of the microactuator 26 is further optimized for this application.

Conclusion

This concludes the description of the preferred embodiment of the invention. The following describes some alternative embodiments for accomplishing the present invention.

For example, any number of different types of disk drives could be used in with the present invention. Those skilled in the art will recognize that the present invention could be applied to both magnetic and optical disk drives.

In another example, data storage devices having different structures and components from those described herein could benefit from the present invention. Those skilled in the art will recognize that the head-arm assembly could have a different structure from that disclosed herein without departing from the scope of the present invention. Those skilled in the art will recognize that the present invention could be used with heads that only read, but do not record. Those skilled in the art will also recognize that the present invention could be used to position optical heads rather than magnetic heads.

In summary, the present invention discloses a suspension-level piezoelectric microactuator for the fine positioning of a head-arm assembly of a disk drive. The microactuator is manufactured from a generally flat metal sheet structure having a central beam and two tabs extending from opposite sides of the beam. At least one layer of piezoelectric material is bonded onto each of the two tabs. Each of the two tabs is bent, with the piezoelectric layers bonded thereto, to a position substantially normal to the central beam. The tabs are then spot-welded to the rails at one end of a suspension member of the head-arm assembly. A recording head is connected to the central beam of the microactuator. When a voltage is applied to the piezoelectric materials, deflection of the microactuator occurs, thereby positioning the recording head.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. Apparatus for positioning a head adjacent a recording surface of a recording media, said recording surface defining multiple data track locations, the apparatus comprising:
   a movable support arm supporting the head adjacent the recording surface and movable for course positioning of the head relative to each of the data track location; and
   fine positioning means disposed on the movable support arm, for selectively mounting and fire positioning of the head relative to each of the data track location wherein the fine positioning means includes two monomorphs constructed from a metal sheet having symmetrically bent tabs on which a piezoelectric element is attached.

2. The apparatus of claim 1 wherein the fine positioning means precisely aligns the head with respect to one of the multiple data track locations.

3. The apparatus of claim 1 wherein the fine positioning means positions the head in a range of movement of about half a width of a data track.

4. The apparatus of claim 2 wherein the range of movement comprises distances on a nanometer scale.

5. The apparatus of claim 2 wherein the range of movement comprises distances of at least ±0.5 $\mu$m for a track pitch of 1 $\mu$m.

6. The apparatus of claim 1 wherein voltages are applied to the piezoelectric elements to cause the piezoelectric elements to expand or contract thereby creating a bending motion in the fine positioning means.

7. The apparatus of claim 1 wherein a pivot point is created by having the two monomorphs intersect at their deflecting ends such that they prevent each other from deflecting translationally thereby resulting in rotation.

8. The apparatus of claim 7 wherein a lever arm is attached to the pivot point and the lever arm converts the rotation about the pivot pin into a translation of the fine positioning means.

9. The apparatus of claim 1 wherein the two monomorphs are aligned on either side of a central beam between the tabs.

10. The apparatus of claim 9 wherein the head is attached to an end of the beam.

11. The apparatus of claim 1 wherein opposite poling on each end of the piezoelements produces curvature in the tabs to effect the movement of the head.

12. A data storage device, comprising:
   (a) one or more recording surfaces for storing data thereon;
   (b) one or more head assemblies for accessing data stored on the recording surfaces, each of the head assemblies including a first stage positioner and a second stage positioner, wherein the first state positioner provides for course positioning of a head assembly relative to the recording surface and the second stage positioner comprises a piezoelectric microactuator for fine positioning of the head assembly relative to the recording surface wherein the piezoelectric microactuator is comprised of two monomorphs constructed from a metal sheet having two bent-up tabs on to each of which a piezoelectric element is attached; and (c) a servo system for positioning the head assemblies relative to the recording surfaces, wherein the servo system controls both the first stage positioner and the second state positioner.

13. The data storage device of claim 12, wherein the first-stage positioner positions the head assembly in a vicinity of the data stored on the recording surface and the second stage positioner precisely aligns the head assembly.

14. The data storage device of claim 12, wherein the recording surfaces comprise disks having one or more tracks thereon, the first-stage positioner positions the head assembly in a vicinity of a desired track storing the data, and the piezoelectric microactuator positions the head assembly in a range of movement of about half a width of the desired track.

15. The data storage device of claim 14, wherein the range of movement comprises distances on a nanometer scale.

16. The data storage device of claim 14, wherein the range of movement comprises distances of at least ±0.5 $\mu$m for a track pitch of approximately 1 $\mu$m.

17. The data storage device of claim 12, wherein voltages are applied to cause the piezoelectric microactuator to expand or contract, thereby creating a bending motion in the microactuator and deflection in a lever arm attached to one end of the piezoelectric microactuator.

18. The data storage device of claim 12, wherein the piezoelectric microactuator is selected from a group comprising piezoelectric monomorphs and piezoelectric bimorphs.

19. The data storage device of claim 18, wherein a pivot point is created by having two monomorphs intersect at their deflecting ends, such that they prevent each other from deflecting translationally, thereby resulting in rotation about the pivot point.

20. The data storage device of claim 19, wherein a lever arm is attached to the pivot point and the lever arm converts the rotation about the pivot point into a translation of the microactuator's position.

21. The data storage device of claim 12, wherein the first stage positioner is comprised of an arm and a suspension member, the piezoelectric microactuator is mounted on an end of the suspension member, and a reading and/or recording head is mounted on an end of the microactuator.

22. The data storage device of claim 12, wherein the tabs are attached to a suspension member.

23. The data storage device of claim 12 wherein the two monomorphs are aligned on either side of a central beam between the tabs.

24. The data storage device of claim 23, wherein the head is attached to an end of the beam, and the beam acts as a lever arm.

25. The data storage device of claim 12, wherein opposite poling on each end of the piezo elements produces curvature in the tabs to effect the movement of the head.

* * * * *